United States Patent Office 3,408,421
Patented Oct. 29, 1968

3,408,421
CARBOXYL-TERMINATED POLYESTER-EPOXY ADDUCT
Kurt A. Kurka, Roseville, Minn., assignor to Minnesota Mining and Manufacturing Company, St. Paul, Minn., a corporation of Delaware
No Drawing. Filed Jan. 10, 1964, Ser. No. 336,873
7 Claims. (Cl. 260—830)

ABSTRACT OF THE DISCLOSURE

A heat-curable polyester-epoxy adduct curable to a flexible resin is provided comprising a mixture of carboxyl-terminated polyester and epoxy resin, the polyester being derived from a polycarboxylic acid compound and a lactone, the polyester and epoxy resin being combined in an approximate equivalent weight ratio of epoxy groups to carboxyl groups in the range of about 1:4 to 4:1.

---

This invention relates to polyester-epoxy resin compositions which cure to a tough, flexible state and are useful in a variety of applications but which find special use in electrical insulating applications.

I have discovered a new class of polyester-epoxy resin compositions which, when cured, produce flexible resins similar to the cured products of Kurka and Bond, U.S. Patent No. 3,027,279, but which employ a class of polyesters different from those employed in Kurka and Bond compositions and which have characteristics unexpectedly different from, and for certain uses superior to results reported in the Kurka and Bond patent. Liquid compositions of this invention have unusually low viscosities while the solid compositions have unusually sharp melting points. Even though the melting points are characteristically not very high, the powered solid compositions remain stably dry and free-flowing during prolonged storage, even in hot weather, and then cure at moderately elevated temperatures to provide cured products having unusually good flexibility and toughness.

These new compositions contain an epoxy resin and a carboxyl-terminated polyester ("carboxyl" as referred to herein may be a carboxylic acid group or a combination of carboxylic acid and carboxylic acid anhydride groups) which is preformed from a polycarboxylic acid or an anhydride containing polycarboxylic acid (referred to herein as an initiator), and a lactone selected from the group consisting of 7, 8 and 9 membered ring structures. The resulting polyester product is characterized by having:

(a) a calculated average of at least 2.0 carboxyl groups per molecule,
(b) an acid number of from about 15 to 300, as determined by aqueous KOH titration,
(c) an average molecular weight of at least 500.

The epoxy resin, on the other hand, contains on the average at least 1.3 groups per molecule which are readily reactive with the carboxyl group. At least one of such groups is the epoxy group (i.e., either oxirane or oxetane) and another such group may be the aziridine group. Such groups are separated from each other in a molecule by a chain of at least two carbon atoms, which chain is free from ethylenic unsaturation.

As indicated, the polyester-epoxy compositions of this invention are capable of heat curing to infusible, insoluble, flexible resins. By the term "flexible," reference is had to the fact that an 8 gauge copper wire, having a 10 mil cured coating of a composition of this invention, can be bent around a ¼-inch diameter mandrel without cracking. Indeed, some of the cured compositions of this invention are so flexible that a 50–60 mil coating will also pass this test.

Preferred polyester-epoxy compositions of this invention are in the form of bulk quantities of small, discrete, normally solid and brittle, generally uniformly sized storable particles, each of which has an average thickness of less than about 150 microns (i.e., the particles will pass through a standard 100 mesh sieve). Such particles are suitable for use in conventional coating techniques wherein heated work pieces are contacted with such particles to provide smooth, fused, well-bonded, cured resinous coatings.

The carboxyl-terminated polyester of this epoxy resin composition is a lactone adduct of polycarboxylic acids which contains an average of 2.0 or more carboxyl groups per molecule and has an acid number of from about 15 to 300 as determined by aqueous base titration. The polyester is essentially free from ethylenic unsaturation and will not gel when heated in the absence of air.

Preferred polyesters useful in making products of this invention have not less than 2.0 carboxyl groups per molecule. These adducts, which may be of widely varying and yet readily controllable molecular weight, are characterized by the presence of lactone residues which, in the polyesters, are interconnected to form a series of substantially linear groups derived from the lactones.

The polyesters useful in this invention include adducts of polycarboxylic acid compounds (herein termed "initiators") with individual unsubstituted and substituted lactones, with mixtures of different substituted lactones, and with mixtures of substituted and unsubstituted lactones, as well as blends thereof.

The lactone used as a starting material may be any lactone, or combination of lactones, having at least six carbon atoms in the ring and is represented by the general formula:

(1) 

in which $n$ is a positive whole number not less than four, at least $n+2$ R's are hydrogen, and the remaining R's are substituents selected from the group consisting of hydrogen, alkyl, cycloalkyl, alkoxy and single ring aromatic hydrocarbon radicals. Lactones having greater number of substituents other than hydrogen on the ring, and lactones having five or less carbon atoms in the ring are considered unsuitable for the purpose of the invention because of the tendency that polymers thereof have to revert to the monomer, particularly at elevated temperature.

The lactones preferred in this invention are the epsilon-caprolactones having the general formula:

(2) 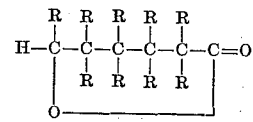

wherein at least six of the R's are hydrogen and the remainder are selected from the group consisting of hydrogen, alkyl, cycloalkyl, alkoxy or single ring aromatic hydrocarbon radicals. None of the substituents contain more than about twelve carbon atoms, and the total number of carbon atoms in the substituents on a lactone ring does not exceed about twelve. Unsubstituted epsilon-caprolactone, in which all the R's are hydrogen, is a derivative of 6-hydroxyhexanoic acid.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms; trialkyl epsilon-caprolactones in which two or three carbon atoms of the lactone are substituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having seven or eight carbon atoms in the ring, e.g., zeta-heptylolactone and eta-caprylolactone, may also be employed in the invention.

The various lactones may be utilized individually or in combination. When lactone-derived polyesters prepared in accordance with the invention are intended to be used in liquid epoxy resin compositions, it is generally preferred to utilize subtsituted or mixtures of substituted and unsubstituted lactones in order to achieve liquid carboxyl-terminated polyesters. When the polyesters are intended to be used as solid, powdered epoxy resin compositions, it is generally preferred to utilize unsubstituted lactones which in general provide higher melting polyesters.

The initiators that are capable of reacting with lactones and of forming carboxyl-terminated polyesters are compounds having at least one acid group capable of opening the lactone ring and adding to it as an open chain without forming water of condensation. Compounds suitable as initiators are represented by the general formula:

(3) 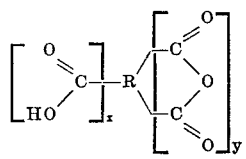

wherein R is an organic radical selected from the group consisting of aliphatic, cycloaliphatic, aromatic and heterocyclic radicals and also polymeric forms of such radicals, $x$ and $y$ are positive whole numbers, $x$ is not less than 1, and $x$ and $y$ together total at least two.

Examples of some suitable initiators among a large variety available are pyromellitic acid, mellitic acid, benzophenone tetracarboxylic acid, cyclopentane tetracarboxylic acid, trimesic acid, trimellitic acid, citric acid, aconitic acid, trimellitic anhydride, hemimellitic anhydride, isophthalic acid, phthalic acid, 2,6-dicarboxynaphthalene, and its 2,3 and 2,7 isomers, also adipic acid, sebacic acid, azelaic acid, maleic acid, succinic acid, dimerized oleic acid, and the like.

In general, the polyester preparation involves heating a mixture of polycarboxylic acid with lactone at temperatures of about 150° C. for a time sufficient to effect polymerization. Details of preparation procedures are given in such references as Fowler et al., British Patent 859,645; Young et al., British Patent 859,639; Hotstettler et al., British Patent 859,643; or Young et al., British Patent 859,644.

The preparation of polyesters in accordance with this invention has the unique advantage of permitting accurate control of average molecular weight and further of promoting the formation of a substantially homogeneous polyester in which the molecular weights of the individual molecules are substantially all very close to the average molecular weight. For example, if it is desired to form a polyester in which the average molecular weight is approximately ten times the molecular weight of the initial lactone or lactones, then the proportion of lactone to initiator utilized in the polymerization is fixed at approximately 10:1 and on an average each molecule of initiator will add on an approximately equal number of lactones. The characteristic molecular weight uniformity of solid polyesters accounts for the fact that softening of the lactone crystalline polyesters does not take place until the melting point is reached.

In the case of liquid polyesters, those prepared from the lactones are characterized by having low bulk viscosity over a broad molecular weight range, due to their particular structure and essentially uniform molecular weight.

In the preparation of carboxyl terminated latcone polyesters intended for use as intermediates for the epoxy resin compositions of this invention, the relative proportions of lactone to initiator should be such as to produce polyesters having an average molecular weight of about 1000 to 7500. It is to be understood, however, that substantial departures from this molecular weight range can be used, i.e., to as low as 500 if more rigid properties are desired and to as high as 15,000 if highly flexible compositions are desired. One preferred class of polyesters has a molecular weight falling in the range of about 2,500 to 5,000.

The oxirane and/or oxetane groups in the epoxy resin useful in this invention are readily reactive with the carboxyl groups. If only oxirane and oxetane reactive groups are present, the epoxy oxygen atoms should be separated by a chain of at least four carbon atoms. Preferably, the epoxy resin has little or no ether oxygen other than attached directly to aromatic rings.

Particularly useful epoxy resins are liquid or solid polyglycidyl ethers of polyhydric phenols such as resorcinol, or bisphenol A, which usually has slightly less than 2.0 groups per average molecular weight, but sometimes have more than 2.0 oxirane groups. For example, polyglycidyl ethers of phenol-formaldehyde novolaks (e.g., "Epiphen" 849, a trade mark of the Borden Chemical Co.) having 2.5 to 3 oxirane groups per average molecular weight are useful in this invention. Also useful is the epoxy resin "Epon" 1310, a trade mark of the Shell Chemical Co., which is the condensation product of 1,1,2,2-tetrakis(4-hydroxyphenyl) ethane and epichlorhydrin having an average of about 3 glycidyl ether groups in the molecule. Another epoxy resin which has provided excellent results in preparing compositoins of this invention is the liquid alicyclic epoxy resin of the formula (4) 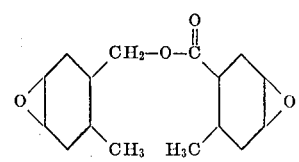

such as the resin presently marketed as "Unox" 201, a trade mark of the Union Carbide Corporation, and formely marketed as "EP-201."

Other useful monomeric epoxy resins include limonene dioxide, dicyclopentadiene dioxide, vinylcyclohexene dioxide and 3,4 - epoxy - 6 - methylcyclohexylmethyl - 3,4-epoxy-6-methylcyclohexenecarboxylate.

For use with the solid lactone-derived polyesters, the epoxy resin should have a melting point of not less than about 55° C. and it is preferred that its melting point be not less than about 95° C. Examples of such materials are the glycidyl ethers of bisphenol A and include the "Epon" 1001 through 1009 series; D.E.R. 661 through 669 series, marketed by Dow Chemical Co.; "Araldite" 6071 through 6099 series, marketed by Ciba; EKR 2002 through 2053 series, marketed by Union Carbide; and "Epi-Rez" 520 through 560 series, marketed by Jones-Dabney. Examples of polyglycidyl ethers of phenol-formaldehyde novolaks include "Kopox" 737A, 995A, 997A series, marketed by Koppers Chemical.

To make compositions of the present invention one can simply blend the polyester with the epoxy resin. When liquid starting materials are involved, one can simply mix the two liquids together and stir until a homogeneous mass results. In the case of solid starting materials, it is convenient, for example, to divide up the solid polyester and solid epoxy starting materials into the form of fine powders, preferably, having maximum average particle sizes not more than about 400 microns and then blend the resulting powders together into proportions desired.

When the compositons of this invention consist essentially of only the carboxyl-terminated polyester and the epoxy resin, these are preferably present in amounts such that one epoxy group is present for each carboxyl group in the polyester. The presence of other materials in the composition may have a profound effect upon the preferred proportion of epoxy and carboxyl groups. For instance, the presence of an agent which catalyzes the reaction of one epoxy group with another could enable a substantial excess of epoxy groups to be present in the original composition without ill effect on the cured products. Likewise, the composition may contain a cross-linker for epoxy resin such as a polycarboxylic acid or a polycarboxylic acid anhydride, in which case the carboxyl terminated polyester might be present in very small proportion, acting as a toughening agent.

The composition may also include fillers, such as mica, asbestos fines, finely divided silica, alkyl ammonium bentonites, etc., which are employed advantageously for the inhibition to excessive flow during heat curing. Certain of these fillers such as alkyl ammonium bentonites also serve to some extent as curing accelerators in the blended mixtures. Filler content may vary from about 0.5% by weight of the compositon, as where an alkyl ammonium bentonite or equivalent is employed, up to as high as about 50% by weight of the compositon, or even more, such as 70% by weight of the composition.

To cure compositions of this invention to the final desired infusible, insoluble, flexible resins, one simply heats the composition to the fusion point and maintains the same at this temperature for a period of time sufficient to effect the necessary curing (i.e., crosslinking) action. This period of time is about 12 to 24 hours at 150° C. for most of the products of this invention, though curing times and temperatures can and do vary from one composition to another, as those familiar with this art readily appreciable. The rate of curing, however, can be greatly accelerated catalytically. Consequently, curing catalysts are preferred components in compositions of this invention. A number of catalysts known to the art are useful for curing the epoxy-polyester compositons of this invention such as tris(2,4,6 - dimethylaminomethyl)phenol available commercially as DMP–30 by Rohm & Haas Chemical Co., dicyandiamide, benzyl dimethyl amine, dimethylaminopropyloxylamide, tetrakis(2 - diethylaminoethyl)ethylenedinitrilotetra acetate, tin tetrachloride pentahydrate, and stannous soaps of aliphatic carboxylic acids. Commonly, the amount of catalyst employed will be below 1% of the total weight of the reactive ingredients of a composition, but as much as 10% may be beneficial in some instances. Those skilled in the art will probably consider that, generally speaking, the compositions of this invention are of the slow-cure type because curing times are commonly of the order of an hour or two even with the use of catalysts to promote heat curing, though, of course, by choice of suitable catalyst these curing times can be shortened greatly. Generally, in preferred compositions of this invention there is present not less than about 30 weight percent combined weight of carboxyl-terminated polyester and epoxy resin. The ratio of carboxyl-terminated polyester to epoxy resin is such that the equivalent weight ratio of epoxy groups to carboxyl groups falls in the range of about 1:4 to 4:1. In such preferred compositions there is usually not more than about 10 weight percent of curing catalyst and the balance up to 100 weight percent for any given composition is a filler.

One class of preferred polyester epoxy compositions of this invention comprises a mixture of a polyester and an epoxy resin wherein the polyester is derived from an epsilon-caprolactone and an aromatic polycarboxylic acid having from 2 to 6 carboxyl groups attached to a single aromatic ring structure. Such polyester is characterized by having a calculated average of at least 2.0 carboxyl groups per molecule, an acid number from about 15 to 300 as determined by aqueous KOH titration, and an average molecular weight of at least 500.

Another preferred polyester epoxy composition of this invention employs a polyester adduct of a lactone and a dicarboxylic acid having 2 carboxylic acid groups separated by an aliphatic chain ranging from about 2 to 34 carbon atoms. This polyester preferably has an acid number of from about 15 to 300 as determined by aqueous KOH titration, and an average molecular weight of from about 500 to 7500. This lactone contains at least 1 compound selected from the group consisting of methyl epsilon-caprolactone.

An especially preferred class of polyester epoxy compositions of this invention comprises a mixture of polyester and epoxy resin wherein the polyester is adduct of an epsilon-caprolactone and a polycarboxylic acid containing at least one cyclic anhydride group and at least one —COOH group, which groups are preferably directly attached to an aromatic ring such as trimellitic anhydride (the anhydride of 1,2,4-benzene tricarboxylic acid). This polyester preferably has an average molecular weight of from about 500 to 7500, a calculated anhydride group content of from about 1.0 to 15.0 mole percent, a —COOH group content of from about 0.5 to 10.0 mole percent, an acid number of from about 15 to 300 as determined by aqueous KOH titration.

Another especially preferred product of this invention is a composition in the form of bulk quantities of small, discrete, normally solid and brittle, storable and yet temporarily heat-fusible and thermosetting particles having average sizes within the range of 400 to 10 microns, said particles being suitable for application by suspension coating techniques to heated workpieces to provide a fused, well-bonded smooth coating thereon, and preferably being stable at room temperature. Such product comprises:

(a) a carboxyl-terminated polyester being derived from a polycarboxylic acid-anhydride and a lactone and characterized by having an acid number of 15 to 300 as determined by aqueous KOH titration, a calculated average of at least 1.0 carboxyl group and 1.0 anhydride group per molecule and a calculated molecular weight of from 500 to 7500;

(b) a solid epoxy resin selected from the class consisting of products derived from the condensation of epichlorohydrin and bisphenol A and products derived from the condensation of epichlorohydrin and phenol-formaldehyde novolak resins said solid epoxy resin being characterized by having a Durran's melting point of at least 65° C.;

(c) a curing catalyst; and
(d) a filler.

An especially preferred product of this type is one wherein the particles comprise an essentially homogeneous blend of:

(1) A carboxyl-terminated polyester prepared from the reaction of trimellitic anhydride and epsilon-caprolactone and characterized by having an acid number of about 50 to 55, as determined by aqueous KOH titration, a calculated molecular weight of about 3000 to 3500 and a calculated average of 1.0 carboxyl group and 1.0 anhydride group per molecule;

(2) An epoxy resin derived from the condensation of epichlorohydrin and bisphenol A and characterized by having a Durran's melting point of about 100° C. and an epoxide equivalent of about 950;

(3) A tertiary amine catalyst such as tris(2,4,6-dimethyl-aminomethyl)phenol; and (4) A filler such as ground mica.

Preparation and properties of typical carboxyl-terminated polyesters having utility in the present invention are now described below. In this specification, the acidity is reported in terms of the number of milligrams of aqueous KOH (potassium hydoxide) necessary to neutralize one gram of polyester (the so-called acid number). Similarly, the calculated average number of carboxyl groups per polyester molecule is determined by the functionality of the initiator used, and the calculated molecular weight is determined by end group analysis and the functionality of the initiator, as those skilled in the art will appreciate.

Polyester A

This polyester was formed in an inert atmosphere using a three neck flask fitted with stirrer, thermometer, gas inlet tube and condenser. 305 grams (1.2 moles) of pyromellitic acid was reacted with 3471 grams (30.4 moles) of ε-caprolactone containing 3.8 grams (0.1% by weight) of $BF_3$-ethyl Cellosolve complex. Enough catalyst containing ε-caprolactone was added to the acid to make a slurry. This was heated to 70° C. and the rest of the ε-caprolactone added in increments over a period of 1 hour. This temperature was maintained with stirring for 15 hours. The mass was allowed to cool and after a few hours it crystallized to a hard, brittle mass. This polyester had an acid number of 80 and a calculated molecular weight of about 2700 and contains about 4.0 carboxyl groups per molecule.

Polyester B 1368 grams (12.0 moles) of epsilon-caprolactone was heated under a blanket of nitrogen with 99.6 grams (0.6 mole) of isophthalic acid at 150° to 170° C. for 8 hours in a 3 neck round bottom flask equipped with stirrer, thermometer, $N_2$ inlet and condenser. A vacuum of 0.35 mm. Hg pressure was applied to this reaction for 1 hour at 170° C. to strip out any unreacted monomer. This polyester had an acid number of 46.7 and a calculated average molecular weight of about 2400, and contains about 2.0 carboxyl groups per molecule.

Polyester C 570 grams (5.0 moles) of epsilon-caprolactone was heated under a blanket of nitrogen with 35 grams (0.167 mole) of trimellitic acid for 5.75 hours at 150–155° C. The refractive index $\eta_D^{60}$ changed from 1.4550 to 1.4674 during this time. A vacuum of 0.5 mm. Hg pressure was applied for 20 minutes at 150° C. to strip out unreacted monomer. A 98.0% yield of polyester was obtained with an acid number of 50, a calculated average molecular weight of about 3360 and contains about 3.0 carboxyl groups per molecule.

Polyester D 3420 grams (30.0 moles) of epsilon-caprolactone was heated under nitrogen with 192 grams (1.0 mole) of trimellitic anhydride and 6.8 grams of isopropoxytitanium stearate at 150–160° C. for 10 hours. The refractive index $\eta_D^{60}$ changed from 1.4544 to 1.4673 during this time. A vacuum of 0.75 mm. Hg pressure was applied for 1 hour at 155° C. to remove any unreacted monomer. A 98.8% yield of polymer was obtained with a free acid number of 33.9 and an anhydride content of 0.142 millimoles, this as determined by a non-aqueous titration with sodium methoxide reagent, and contains approximately a combined total of 2.5 anhydride and acid groups per molecule. The anhydride content is only 51.3% of theoretical due to hydrolysis of the anhydride from residual moisture in the ε-caprolactone.

Polyester E 137.9 lbs. (549 moles) of epsilon caprolactone and 12.5 lbs. (22.3 moles) of pyromellitic acid was heated to 150° C. in a 20 gallon stainless steel Dowtherm reactor, blanketed by a nitrogen gas flow, for 3 hours. A vacuum of 10 mm. Hg was applied for ½ hour at this temperature. The product was poured out and allowed to crystallize. A 99.5% yield of polyester was obtained having an acid number of 73.5, a calculated molecular weight of about 3050 and contains about 4.0 carboxyl groups per molecule.

Polyester F

This liquid resin was based on a polyester prepared by reaction of a dibasic acid containing an average of 36 carbon atoms (prepared by the dimerization of oleic acid, and sold under the trade name "Empol" by Emery Industries) with epsilon-caprolactone and methyl epsilon-caprolactone. 634 grams (1.0 mole) of Empol 1024 (contains 75% dimer acid whose molecular weight is 565 and 25% trimer acid whose molecular weight is 845) was heated with 465 grams (4.0 moles) of epsilon-caprolactone. 128 grams (1.0 mole) of methyl epsilon-caprolactone and 1.2 grams of octylene glycol titanate catalyst for 9 hours at 160°–170° C. The refractive index $\eta_D^{60}$ changed from 1.4634 to 1.4693 during this time. A vacuum of 0.10 mm. Hg pressure was applied for 1½ hours at 165° C. to strip out unreacted monomer and complete the reaction. A 99.7% yield of polyester was obtained having an acid number of 99, a calculated molecular weight of about 1275, a viscosity of 8000 cps. at 23° C. and contains an average of about 2.25 carboxyl groups per molecule. Polymerization of the dimer acids with epsilon-caprolactone results in a compatible system that when cured with an epoxy resin is very flexible and has superior electrical properties.

Illustrative compositions of the present invention are described in the following examples, in the first of which is employed a typical epoxy resin which is marketed commercially as "Epon 1004" by Shell Chemical Corp. This resin is a condensation product of epichlorohydrin and bisphenol A, has a Durran's melting point of about 100° C. and an epoxide equivalent of about 950.

EXAMPLE 1

300 grams (about 0.42 carboxyl equivalent) of polyester A, 400 grams (about 0.42 oxirane equivalent) of said epoxy resin, and 7 grams of Bentone 38 (an alkyl ammonium bentonite filler) are mixed on rubber mill. Upon cooling the mixture crystallizes to a friable solid and is pulverized to a fine powder. This powder is placed in a fluidizing apparatus, and metal panels preheated to 200° are coated by dipping them into the fluidized powder. The coatings are post cured at 200° C. for 1 hour. The films stripped from these panels are 5 mils (.005 inch) thick and have the following properties:

| | |
|---|---|
| Dielectric strength, volts/mil | 1400 |
| Volume resistivity, ohm-cm | $3.2 \times 10^{13}$ |
| Dissipation factor | 0.032 |
| Dielectric constant | 3.20 |

These values are measured at 30° C. and the last two at 100 cps. A strip of film loses only 1.07% in weight when soaked in acetone for 24 hours at room temperature. The electrical properties and solvent resistance of this film are excellent.

A ½" strip of cured film is tested on the Instron tensile tester at an initial jaw separation of one inch and a crosshead speed of one inch per minute, evidencing a tensile strength of 560 pounds per square inch with an elongation at break of 190%.

EXAMPLE 2

950 grams (about 1.0 oxirane equivalent) of Epon 1004 is mixed on a rubber mill with 60 grams of Epi-Rez 526 (a leveling agent sold by Jones-Dabney Co.) and 5 grams of BMP–30 catalyst. This mixture is allowed to solidify and is then ground in a hammer mill into particles. The powder is screened to pass a 100 mesh screen. This is blended with 1200 grams (about 1.0 carboxyl equivalent) of similarly powdered Polyester B. Tin panels preheated to 200° C. are coated by dipping into the fluidized powder mixture and post curing for 105 minutes at 200° C. The tensile strength of the cured film (measured as in Example 1) is 245 p.s.i. with a break elongation of 440%.

EXAMPLE 3

1015 grams of the catalyzed, powdered, epoxy resin mixture of Example 2 is blended with 1120 grams of powdered Polyester C. 27 gauge tin metal strips are preheated to 200° C. and coated to 10 mil thickness by dipping into the fluidized powder mixture and post curing for 20 minutes at 200° C. The coated strips are spiraled around a ¼″ rod, then unwound and straightened with no cracking in evidence. Films removed from the strips have a measured tensile strength of 537 p.s.i. and a break elongation of 182%.

EXAMPLE 4

634.0 grams (about 0.67 oxirane equivalent) of Epon 1004, 40.0 grams of Epi-Rez 526, 3.4 grams of DMP–30, 644.0 grams of a finely divided mica filler and 15.0 grams of iron oxide pigment are fused together on a heated rubber mill, cooled and then ground in a hammer mill to pass a 100 mesh screen. 435.0 grams (about 0.67 carboxyl equivalent) of Polyester D also ground to pass a 100 mesh screen, is then blended with the above epoxy powder. The particles of this composition melt and fuse when contacted with a hot object and gel within a few minutes at 200° C. A post cure of 20 minutes is necessary to fully cure the composition. 10 mil films prepared from this composition have the following properties:

Tensile strength _____ p.s.i.__ 958
Elongation at break _____ percent__ 108
Water absorption, 7 days _____ do____ 1.08
Weight loss, 7 days at 130° C. _____ do____ 1.43

Electrical characteristics were:

| Temp. of Measurement. | 23° C. | 60° C. | 90° C. | 105° C. | 120° C. |
|---|---|---|---|---|---|
| Dissipation Factor [1] | .034 | .025 | .080 | .25 | .37 |
| Dielectric Constant [1] | 4.51 | 5.00 | 5.00 | 5.24 | 5.65 |
| Volume Resistivity | 3.4×10$^{14}$ | 1.9×10$^{12}$ | 2.6×10$^{11}$ | 7.6×10$^{10}$ | 4.1×10$^{10}$ |

[1] 100 c.p.s.

EXAMPLE 5

950 grams (1.5 epoxide equivalent) of a solid epoxy resin, having a Durran's softening point of 75–85° C. (Epon 1002), 30 grams of Epi-Rez 526, 32 grams (0.175 carboxyl equivalent) of polysebacic anhydride available as Harcure A from Harchem Division of Wallace & Tiernau, Inc. and 9.0 grams of stannous octoate are mixed on a heated rubber mill and then allowed to cool before grinding in a hammer mill to particles of a size sufficient to pass a 100 mesh screen. 1007.0 grams (1.325 carboxyl equivalent) of Polyester E, also ground to pass a 100 mesh screen, is then blended with the above epoxy powder composition. Film samples are prepared by coating onto preheated panels by dipping into the fluidized powder. At 200° C. the films gel in three minutes and are cured for an additional 10 minutes. The tensile strength properties of these 8 mil films is 1538 p.s.i. with a break elongation of 96%.

EXAMPLE 6

212.2 grams of Polyester F is mixed with 299.2 grams of tetrapropenyl-succinic anhydride and 4.1 grams of DMP–30 catalyst to make a 3250 centipoise viscosity liquid. This low viscosity curing agent is then mixed with 300 grams of a liquid epoxy resin (Epon 828) to make a casting resin of 4000 centipoise viscosity. This catalyzed casting resin has a useable life (pot life) of 10 days at room temperature. The resin is poured into a mold and cured at 121° C. The resin gels in 34 minutes at this temperature and cures to a Shore D Hardness of 55 in 2 hours.

EXAMPLE 7

It is many times desirable, in order to reduce cost and reinforce a very flexible resin, to add a filler to an epoxy casting resin composition. Accordingly, 341.0 grams of the 3250 centipoise viscosity curing agent used in Example 6 is mixed with 200.0 grams of a liquid epoxy resin (Epon 828), 1.0 grams of iron oxide pigment and 360.0 grams of finely divided talc. This filled casting resin has a viscosity of 25,000 centipoises at room temperature. This resin is poured into an aluminum mold containing the thermal shock insert described in "Thermal Shock Tests for Casting Resins," a paper presented by M. Olyphant to the "First National Conference on the Application of Electrical Insulation" at Cleveland, Ohio, September 3–5, 1958. A tough, flexible casting is obtained after 2 hours at 121° C.

The cured sample is heated to 130° C. for 10 minutes and then plunged into a liquid bath at −55° C., but it does not crack. This test is repeated nine more times, but no crack develops. The temperature of the same is raised to 155° C. and then plunged into a −75° C. liquid bath, but the sample does not crack. This resistance to thermal shock indicates that the composition of this example is particularly well adapted for use in encapsulation of electrical components exposed to wide temperature ranges. An even greater improvement is noted in the electrical properties of the composition of this example in comparison to commercially avtilable flexible casting resin compositions. Electrical properties measured on this composition are as follows:

EXAMPLE 7

| Temp. of measurement | 23° C. | 90° C. | 120° C. | 150° C. | 180° C. |
|---|---|---|---|---|---|
| Dissipation Factor [1] | .025 | .048 | .20 | .55 | .68 |
| Dielectric Constant [1] | 4.16 | 5.35 | 5.18 | 5.44 | 5.75 |
| Volume Resistivity | 7.8×10$^{13}$ | 7.5×10$^{13}$ | 3.5×10$^{10}$ | 1.4×10$^{10}$ | 1.0×10$^{10}$ |

[1] 100 c.p.s.

EXAMPLE 8

147.5 grams (0.5 carboxyl equivalent) of Lytron 822 (a polycarboxyl containing styrene copolymer having an equivalent weight of 295 marketed by the Monsanto Chemical Co.) is reacted with 228 grams (2.0 moles) of epsilon-caprolactone at a temperature of 150° C. for 3 hours. The refractive index of the reaction mixture, $\eta_D^{70}$ changes from 1.4815 to 1.4873 over this period of time. This polymer has an acid number of 77 and a calculated equivalent weight of 730.

When 73.0 grams (0.1 carboxyl equivalent) of this polymer is melted into 95.0 grams (0.1 epoxide equivalent) of Epon 1004 containing about ½ weight percent of DMP–30, there is formed a highly viscous paste. This paste is cured at about 120° C. temperature to a tough, leathery, flexible polymer.

EXAMPLE 9

210 grams (1 mole) of trimellitic acid is reacted with 2940 grams (15 moles) of epsilon-cyclohexyl epsilon-caprolactone above, there is formed an acid terminated polyester having 3 carboxyl groups per molecule.

When 1000 grams of this polyester is mixed with 1000 grams of Epon 1004 and then heated to 150° C., there is formed a tough, flexible, cured polyester-epoxy resin.

The polyester-epoxy resin compositions of this invention are suitable for application where a tough, very flexible electrical insulation is required, such as on bus bars, wire, end turns on motor coils and armatures, coils, capacitors, resistors and circuits. They also find uses in the encapsulation and impregnation of electrical components such as transformers, coils, motor stators and electronic circuits. Solid powdered compositions are especially suitable for application by suspension coating methods such as aerated bed dip coating or spray coating onto heated objects that must first be coated and then shaped to its final form. They are eminently suitable for corrosion coatings on metal pipe and panels wherein impact, flexing, and vibration resistance are required.

What is claimed is as follows:

1. A heat-curable polyester-epoxy composition capable of heat curing to an infusible, insoluble, flexible resin, said composition comprising:
   (a) a mixture of a carboxyl-terminated polyester and an epoxy resin, the equivalent weight ratio of epoxy groups to carboxyl groups being in the range of 1:4 to 4:1;
   (b) said polyester being derived from a polycarboxylic acid compound and a lactone, and being characterized by having
      (1) a calculated average of at least 2.0 carboxyl groups per molecule,
      (2) an acid number from about 15 to 300 as determined by aqueous KOH titration, and
      (3) an average molecular weight of at least 500;
   (c) said polycarboxylic acid compound having the general formula

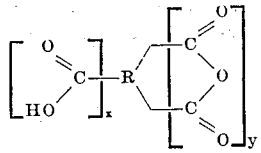

wherein R is an organic radical selected from the group consisting of aliphatic, cycloaliphatic, aromatic and heterocyclic radicals, and polymeric forms of such radicals, and $x$ and $y$ are positive whole numbers, $x$ is not less than 1 and $x$ and $y$ total at least 2;
   (d) said lactone being a compound having the general formula

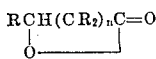

wherein each R is selected from the group consisting of hydrogen, alkyl, cycloalkyl, alkoxy or single-ring aromatic hydrocarbon radicals, $n$ is a positive whole number of from 4 to 6 inclusive, and at least $(n+2)$ of the total number of R substituents are hydrogen;
   (e) said epoxy resin containing, on the average, at least 1.3 groups readily reactive with the carboxyl group, at least one of such groups being selected from the class consisting of oxirane or oxetane, said groups being separated by a chain of at least two carbon atoms, such chain being free from ethylenic unsaturation.

2. A heat curable polyester-epoxy composition capable of heat curing to an infusible, insoluble, flexible resin, said composition comprising:
   (a) a mixture of a carboxyl terminated polyester and an epoxy compound, the equivalent weight ratio of epoxy groups to carboxyl groups being in the range of 1:4 to 4:1;
   (b) said polyester being derived from epsilon-caprolactone and an aromatic polycarboxylic acid having from 2 through 6 carboxyl groups attached to a single aromatic ring structure;
   (c) said polyester being characterized by having
      (1) a calculated average of at least 2.0 carboxyl groups per molecule,
      (2) an acid number from about 15 to 300 as determined by aqueous KOH titration, and
      (3) an average molecular weight of at least 500;
   (d) said epoxy compound containing, on the average, at least 1.3 groups readily reactive with the carboxyl group, at least one of such groups being selected from the class consisting of oxirane and oxetane, said groups being separated by a chain of at least two carbon atoms, such chain being free from ethylenic unsaturation.

3. A heat curable polyester-epoxy composition capable of heat curing to an infusible, insoluble, flexible resin, said composition comprising:
   (a) a mixture of a carboxyl terminated polyester and an epoxy compound, the equivalent weight ratio of epoxy groups to carboxyl groups being in the range of 1:4 to 4:1;
   (b) said polyester being derived from a polycarboxylic acid-anhydride and epsilon-caprolactone and being characterized by having
      (1) an average molecular weight of from about 500 to 7500,
      (2) a calculated anhydride group content of from about 1.0 to 15.0 mole percent,
      (3) a carboxylic acid group content of from about 0.5 to 10.0 mole percent, and
      (4) an acid number of from about 15 to 300 as determined by aqueous KOH titration;
   (c) said epoxy compound containing, on the average, at least 1.3 groups readily reactive with the carboxyl group, at least one of such groups being selected from the class consisting of oxirane or oxetane, said groups being separated by a chain of at least two carbon atoms, such chain being free from ethylenic unsaturation.

4. A heat curable polyester-epoxy composition capable of heat curing to an infusible, insoluble, flexible resin, said composition comprising:
   (a) a mixture of a carboxyl terminated polyester and an epoxy compound, the equivalent weight ratio of epoxy groups to carboxyl groups being in the range of 1:4 to 4:1;
   (b) said polyester being derived from a dicarboxylic acid and a lactone, said polyester being characterized by having
      (1) a calculated average of at least 2.0 carboxyl groups per molecule,
      (2) an acid number from about 15 to 300 as determined by aqueous KOH titration, and
      (3) an average molecular weight of from about 500 to 7500;
   (c) said dicarboxylic acid having 2 carboxylic acid groups separated by an aliphatic chain ranging from about 2 to 34 carbon atoms;
   (d) said lactone containing at least 1 compound selected from the group consisting of methyl epsilon-caprolactone and epsilon-caprolactone;
   (e) said epoxy compound containing, on the average, at least 1.3 groups readily reactive with the carboxyl groups, at least one of such groups being selected from the class consisting of oxirane or oxetane, said groups being separated by a chain of at least two carbon atoms, such chain being free from ethylenic unsaturation.

5. A polyester-epoxy resin composition in the form of bulk quantities of small, discreet, normally solid and brittle, storable particles, having an average maximum size of less than about 400 microns, said particles being suitable for application by suspension coating techniques to heated work pieces to provide a fused, bonded, smooth coating thereon, said particles being further capable of heat curing to a flexible resin, said composition comprising:
   (a) a carboxyl-terminated polyester being derived from a polycarboxylic acid-anhydride and a lactone and characterized by having an acid number of 15 to 300 as determined by aqueous KOH titration, a calculated average of at least 1.0 carboxyl group and 1.0 anhydride group per molecule and a calculated molecular weight of from 500 to 7500;
   (b) a solid epoxy resin selected from the class consisting of products derived from the condensation of epichlorohydrin and bisphenol A and products derived from the condensation of epichlorohydrin and phenol-formaldehyde novolak resins, said solid epoxy resin being characterized by having a Durran's melting point of at least 65° C.;
(c) a curing catalyst; and
(d) a filler;
the equivalent weight ratio of epoxy groups to carboxyl groups being in the range of 1:4 to 4:1.

6. A heat curable polyester-epoxy composition in the form of a mass of small, discreet, normally solid and brittle, storable particles, having a size within the range of 400 to 10 microns, said particles being suitable for application by suspension coating techniques to heated work pieces to provide a fused well-bonded smooth coating thereon, said particles being further capable of heat curing to a flexible resin, said composition comprising:
(a) a carboxyl-terminated polyester derived from trimellitic anhydride and epsilon-caprolactone and characterized by having an acid number of about 50 to 55 as determined by aqueous KOH titration, a calculated molecular weight of about 3000 to 3500 and a calculated average of 1.0 carboxyl group and 1.0 anhydride group per molecule;
(b) an epoxy resin derived from the condensation of epichlorohydrin and bisphenol A and characterized by having a Durran's melting point of about 100° C., and an epoxide equivalent of about 950;
(c) a tertiary amine curing catalyst; and
(d) a filler;
the equivalent weight ratio of epoxy groups to carboxyl groups being in the range of 1:4 to 4:1.

7. The cured product of claim 6 in the form of coatings applied by suspension coating techniques.

References Cited

UNITED STATES PATENTS

| | | | |
|---|---|---|---|
| 3,169,945 | 2/1965 | Hostettler | 260—78.3 |
| 3,203,920 | 8/1965 | Nikles | 260—830 |
| 3,222,312 | 12/1965 | Wyart | 260—830 |
| 2,890,208 | 6/1959 | Young | 260—78.3 |
| 2,933,477 | 4/1960 | Hostettler | 260—78.3 |
| 3,278,557 | 10/1966 | Chibnik | 260—830 |
| 3,278,636 | 10/1966 | Wynstra | 260—835 |

MURRAY TILLMAN, *Primary Examiner.*

G. F. LESMES, S. H. BLECH, *Examiners.*

P. LIEBERMAN, *Assistant Examiner.*